Patented June 26, 1934

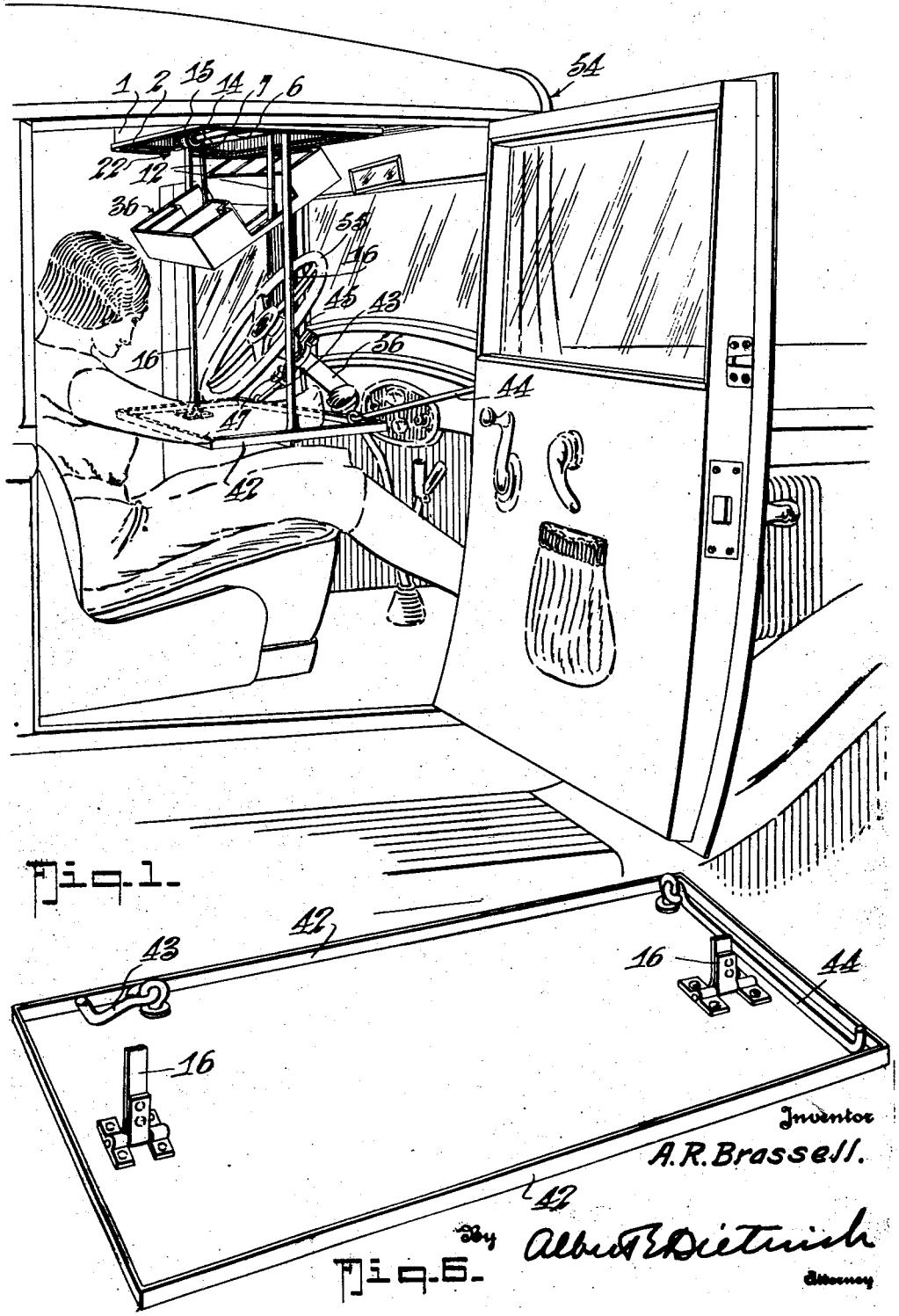

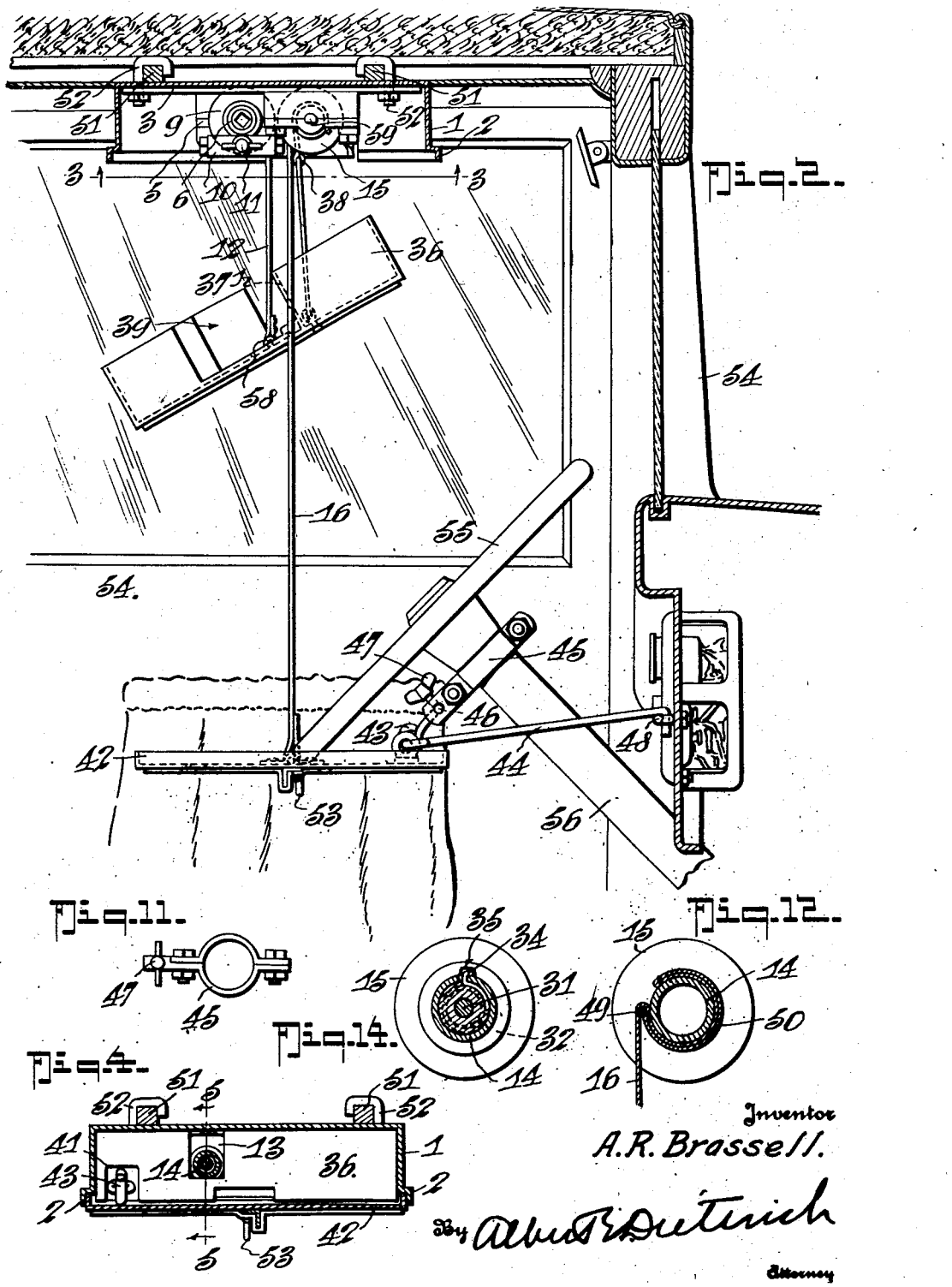

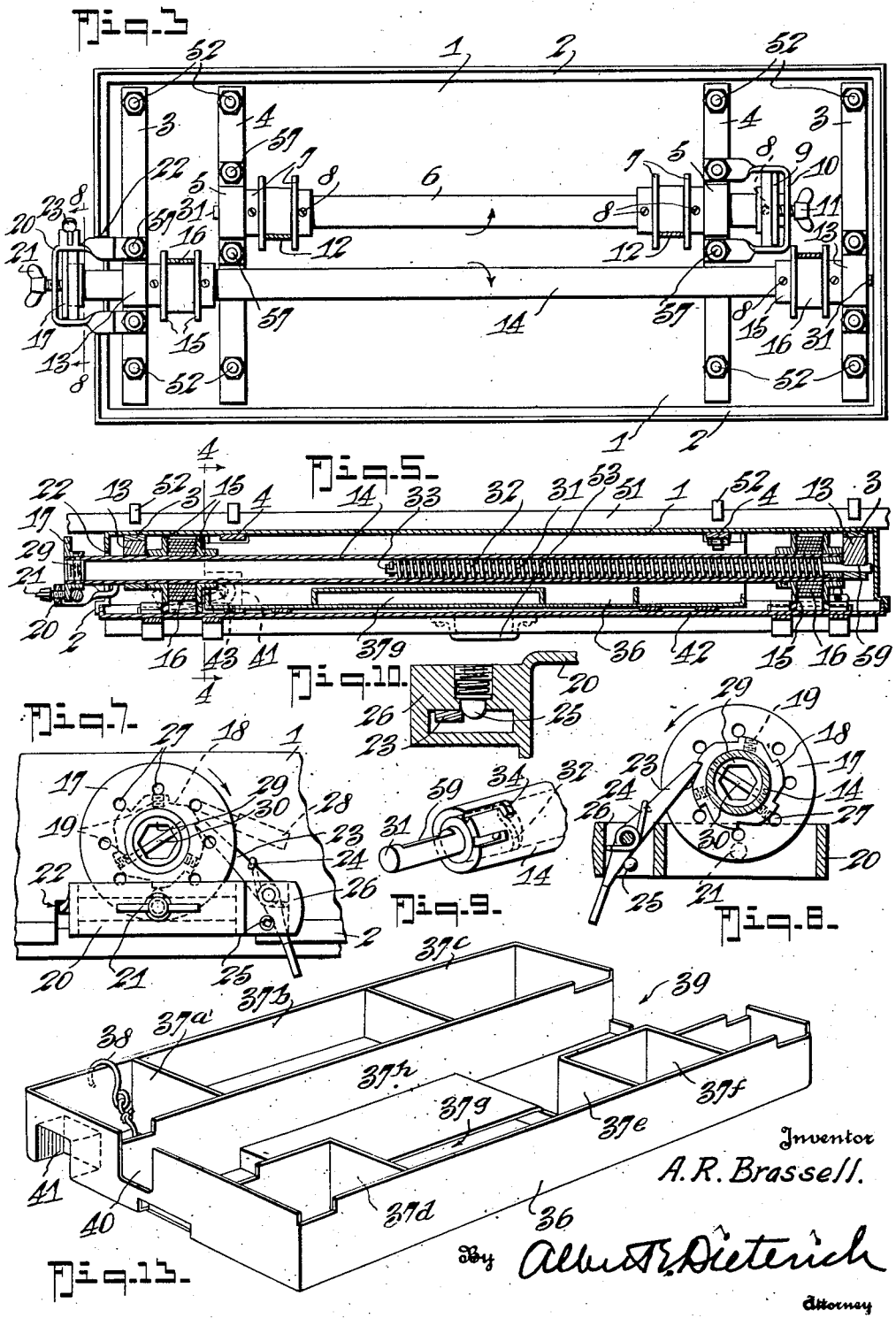

1,964,339

UNITED STATES PATENT OFFICE 1,964,339

ELEVATING DESK FOR MOTOR VEHICLES

Alvy R. Brassell, Hazlehurst, Miss.

Application December 12, 1931, Serial No. 580,679

5 Claims. (Cl. 206—19.5)

My invention relates to desks for use in motor vehicles such as automobiles, flying machines and the like wherein the space for carrying articles of this character is more or less limited.

An object of the invention is to provide a desk or table that is particularly useful in automobiles, especially the coupés and other closed cars so commonly used by travelling salesmen.

Further, it is an object to provide an elevating desk having a table section and a storage compartment or receptacle for stationery, etc., both of which may, when not in use, be elevated and held in a compact assembly under the roof of the car out of the way and so disposed as not to impair the driver's vision either forwardly, or rearwardly via the usual rear view mirror.

Further, it is an object to provide means whereby the table section and the storage compartment may be raised and lowered quickly and with ease and held in the desired positions for convenient use.

Further, it is an object to provide an elevating desk whose table section may be lowered to a position beneath the steering wheel and anchored or held so as to be substantially rigid while in use.

Further, it is an object so to suspend the table section and so position it with respect to the steering wheel that the steering wheel in cooperation with the suspending means will assist in keeping the table section properly placed for use.

Further, it is an object to provide a simple and effective means for locking the desk in the closed (elevated) position in order to prevent tamping therewith by unauthorized persons.

Further, it is an object of the invention to provide an apparatus of the character stated whose table section may be used not only as a writing surface but as a table for holding food or for any other purpose for which such a table may be employed.

Further, it is an object to provide means continuously tending to elevate the table and storage sections of the desk into a supporting body or case which is secured to any suitable overhead support, and to provide positive manually manipulated devices for securing the take-up means against action as when the table and the storage section are in their operative positions, or as when they have been elevated to the compact position in the supporting body or case.

A still further object of the invention is to provide a desk of the character stated with spring roller take-up mechanisms and flexible straps to sustain the table and storage sections and to provide in addition to the positively holding device above mentioned manually controlled back check ratchet and pawl devices for the winding-up shaft of the table section (and that of the storage section also if desired) in order to prevent such take-up mechanisms from acting unexpectedly, as for instance should the manually operated positive means become loose or be not properly set by the user.

Further, it is an object to so arrange the take-up roll mechanisms for the table section and for the storage compartment section that when these sections have been rolled up or elevated the suspending straps will lie substantially in the central plane of the case, thereby properly centering the two sections as they are elevated into the supporting case section.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a perspective view illustrating my invention in use.

Figure 2 is a side elevation of the invention, the supporting case and the vehicle being shown in section.

Figure 3 is a horizontal section on the line 3—3 of Figure 2.

Figure 4 is a cross section on the line 4—4 of Figure 5.

Figure 5 is a longitudinal section on the line 5—5 of Figure 4.

Figure 6 is a detail perspective view of the table section.

Figure 7 is an enlarged detail elevation showing the locking means and the ratchet and pawl device.

Figure 8 is a detail enlarged section on the line 8—8 of Figure 3.

Figure 9 is a detail perspective view of one of the spring rollers showing how the spring is held at one end.

Figure 10 is an enlarged detail sectional view showing the pawl hold-out latch.

Figure 11 is a detail plan of the split clamp for attachment to the steering wheel post.

Figure 12 is a detail cross section showing how the straps are secured to the take-up roller.

Figure 13 is a detail perspective view of the storage section or stationary holding compartment.

Figure 14 is a detail section showing how one of the flanged collars 15 is recessed to fit over the end 34 of the spring.

In the drawings in which is illustrated a preferred embodiment of the invention and its use as applied to an automobile 54, 1 represents the supporting casing or housing which is mounted under the top of the car and has a recessed flange 2 to receive the table 42 as a cover. 3 and 4 indicate rigid cross straps which are secured to the casing 1 by suitable bolt and nut devices 57 and which are secured to the cross bars 51 of the vehicle top by means of suitable hook bolts and nuts 52, see Figure 2.

5 designates the bearings or supports for the spring roller mechanism that carries the stationary compartment or tray 36. This spring roller mechanism includes a tubular roller 6 on which is placed two pairs of flanged collars 7 spaced apart a distance sufficient for the reception of the straps 12 that suspend the tray 36, the flanged collars 7 being secured by suitable set screws 8. 9 is another flanged collar on one end of the tubular roller 6 which is also secured by a set screw 8 and which is adapted to cooperate with a winged set screw 11 in a bridge 10 that is suitably secured by the bolts 57.

12 designates the suspension straps for the stationery storage compartment or tray 36, one end of each of these straps being secured to the spring roller 6 and flanges of the collars 17 as will be later described, while the other ends connect as at 58 to the tray 36.

13 designates bearings for the tubular spring roller 14 that forms a part of the means for suspending and raising and lowering the table section 42. It consists of a cylindrical roller on which are pairs of flanged collars 15 secured by suitable set screws 8, the pairs of flanged collars 15 being provided with end flanges spaced apart a distance sufficient for the passage of the straps 16, one end of each of which is connected to the spring roller via flanges of the collars 15 as will be later explained and the other ends being connected to the table 42 as best shown in Figure 6.

17 is a fifth flanged collar secured to the spring roller 14 by three equally spaced apart set screws 19, the purpose of using three being explained later. The collar 17 is provided with ratchet teeth 18 to cooperate with a check pawl 23 mounted on the extension 26 of the yoke 20, the yoke 20 being secured at 57 and projecting through a cut-away portion 22 in the flange 2 to the outside of the casing 1. The roller 14 also projects to the outside of the casing and the flanged collar 17 is located on the outside of the casing as best shown in Figure 3.

A winged set screw 21 is provided in the yoke 20 to engage the flange of the collar 17 and prevent the turning of the spring roller.

24 designates the pawl engaging spring and 25 indicates a hold-back latch device, the purpose of which is to hold the pawl 23 out of engagement with the ratchet when it is no longer desired to use the pawl in engagement with the ratchet.

The flange of the collar 17 has angularly arranged holes 27 through which the hasp of a lock 28 may be passed securely to lock the spring roller against turning and consequently hold the table 42 in the recessed flange 2, thereby keeping the parts in the compact position.

29 designates a plug with a socket for a crank. This plug is connected by a pin 30 to the roller 14, the pin 30 being protected at its end by the overlying collar 17, see Figure 8.

Each of the take-up roller mechanisms 6 and 14 is of substantially the same construction and each consists of the outer tubular casing 6—14 within which is located a torsion spring 32 on a rod 31, to one end of which, as at 33, one end of the spring 32 is connected. The other end of the spring 32 is passed through an aperture in the hollow tube 14 and hooked over the same as indicated at 34, after which the adjacent flanged collar 15 is put into place, it having a recess 35 to fit over the spring end 34 and hold it in place.

36 is the tray or receptacle for stationery and it has a number of compartments 37a to 37i inclusive in which various articles may be placed, such as letter sheets (large and small), envelopes (large and small), ink, pen, pencils, stamps, etc. etc. as may be desired.

38 is a hook having a flexible cable connection with the tray 36 and adapted to be laid over the spring roller 14 as shown in Figure 2 when the tray is in use to keep it tilted at the proper angle for convenient handling. The straps and hook serve to prevent the forward end of the tray dropping (forward with respect to the direction which the operator is facing) while the engagement between the straps 12 and the edge 37h of the tray prevents the tray from tilting downwardly at the end nearest the user, see Figure 2. The tray 36 is provided with suitable end openings 39 and 40 to fit over the spring roller 14 and the yoke 10.

The tray is also provided with a recess 41 in which the short hook 43 of the table section 42 may lie when the parts are in the compact position. The table 42 is also provided with a long hook that may engage an eye 48 located on the dash of the automobile, see Figure 2. The hook 43 is designed to engage the eye 46 of a split clamp 45 secured to the steering post 56 of an automobile and held in place by a winged set screw 47. Thus it will be seen that when the parts are adjusted as shown in Figure 2 the table section 42 will be held against being elevated by the engagement of the steering wheel 55 and will be held against tilting out of a horizontal plane as well as being held against endwise movement by means of the hooks 43 and 44, etc.

49 indicates pins connecting pairs of flanged collars. The pins are spaced a slight distance from the take-up shafts in order to permit threading the straps 16 between the pin 49 and the take-up shaft 14 or 6. The end of the strap is doubled back upon itself and wound around the shaft 15 as at 50 so as to give a thickness equal to that of the pin 49 or in other words to provide a circumference of the part 50 equal in radius to a radius embracing the pin 49 in order that when the take-up mechanism begins to roll up the straps 16, they will have a circular surface to roll on and be at all times smooth and not humpy.

The spring mechanism for the roller 6 may be identical with that of the roller 14 so that a further detailed description thereof and illustration thereof is believed to be unnecessary.

While I have indicated the back check pawl on the fifth flanged collar of the roller 14 only, it is evident that the same construction may be used on the roller 6, but as that would be mere duplication, further illustration is thought to be unnecessary.

The axes of the take-up rollers 6 and 14 are so located with respect to the central longitudinal vertical plane of the apparatus that when the desk and tray sections are brought to the elevated position their respective straps 12 and 16 will have wound up on the respective take-up rolls in such fashion that the ends which connect with the tray 36 and table 42 respectively will lie in the same plane, i. e., the central longitudinal plane of the casing 1, thereby automatically centering the tray and table elements as they are raised to the compact position.

It should, of course, be understood that the rod 31 has a flattened portion 59 which is clamped in one of the bearings 13 against turning while the hollow spring roller itself turns in the other bearing so that the proper tension may be imparted to the spring 32 when the part suspended from it is being lowered.

The set screws 19 are set about 120° apart in order that at least one of them will be hidden from view at all times and held in such position that it cannot be reached by a screw driver. This prevents one from loosening the collar to permit rotation of the shaft after the padlock has been attached for locking the mechanism.

It should be made clear that while I have illustrated my invention as applied to an automobile it is evident that its use is not so restricted but it may be employed wherever an article of this nature will be found useful.

The table section 42 is provided with a handle 53 so it can be conveniently lowered.

Further, it is understood that slight changes in the details of construction, combination, arrangement and design of parts may readily be made without departing from the spirit of the invention or the scope of the appended claims.

From the foregoing description, taken in connection with the accompanying drawings, it is thought the complete construction, operation and advantages of my invention will be clear to those skilled in the art to which it appertains.

What I claim is:

1. In an appliance of the character stated, a fixed supporting casing, a table section and a storage receptacle section, said receptacle section being constructed to fit into said casing and said table section being constructed to serve as a cover for said casing, flexible suspension elements for said table and receptacle sections, take-up rollers in said casing for winding up said flexible suspension elements, and means for securing said take-up rollers at positions for holding said table and receptacle sections in their desired positions.

2. In an appliance of the character described, an overhead supporting casing, two oppositely rotatable parallel spring take-up roller devices mounted thereon adjacent one another, pairs of flanged collars located on said rollers and between which collars suspended straps are anchored so as to be wound around the rollers, suspended elements to which the free ends of pairs of said straps are respectively connected, the positions of said rollers with respect to one another being such that when said straps are fully wound up the end portions which are attached to said elements will all lie in the same plane, with one of said suspended elements located wholly within the supporting casing and the other serving as a cover for the casing.

3. In an appliance of the character described, an overhead supporting casing, two oppositely rotatable parallel spring take-up roller devices mounted thereon adjacent one another, pairs of flanged collars located on said rollers and between which collars suspended straps are anchored so as to be wound around the rollers, suspended elements to which the free ends of pairs of said straps are respectively connected, the positions of said rollers with respect to one another being such that when said straps are fully wound up the end portions which are attached to said elements will all lie in the same plane with one of said suspended elements located wholly within the supporting casing and the other serving as a cover for the casing, the first of said suspended elements comprising a tray having compartments for miscellaneous articles and having portions removed to fit over said rollers.

4. In an appliance of the character described, the combination with an automotive vehicle having a top, a dash, a steering wheel, and a steering wheel post; a table section, straps for suspending the same from the top of said vehicle, said straps being connected to said table sections, means continuously tending to elevate said table section, said table section when in use lying beneath said steering wheel with the wheel against the top of the table section, a fixed clamp member on the steering wheel post, a hook carried by the table section to be secured in said fixed clamp member, and a second hook carried by the table section and engaging an eye secured to said dash for steadying the portion of the table section which is remote from the steering wheel.

5. In an appliance of the character stated, the combination of a supporting casing, a table section serving as a cover for the casing section, a storage receptacle section designed to fit into the casing section, spring roller and flexible band means for suspending said sections from said casing, and means to secure said sections at various elevations below the level of the supporting casing.

ALVY R. BRASSELL.